Dec. 26, 1950     L. A. HENNINGSEN     2,535,795
CATTLE GUARD
Filed Nov. 19, 1949
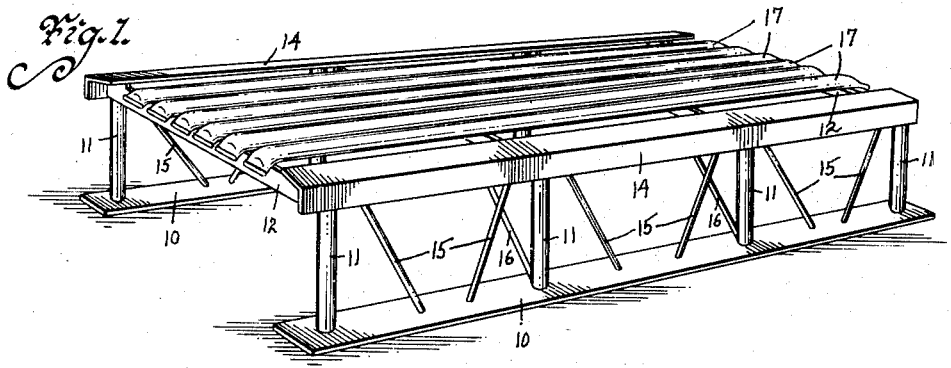
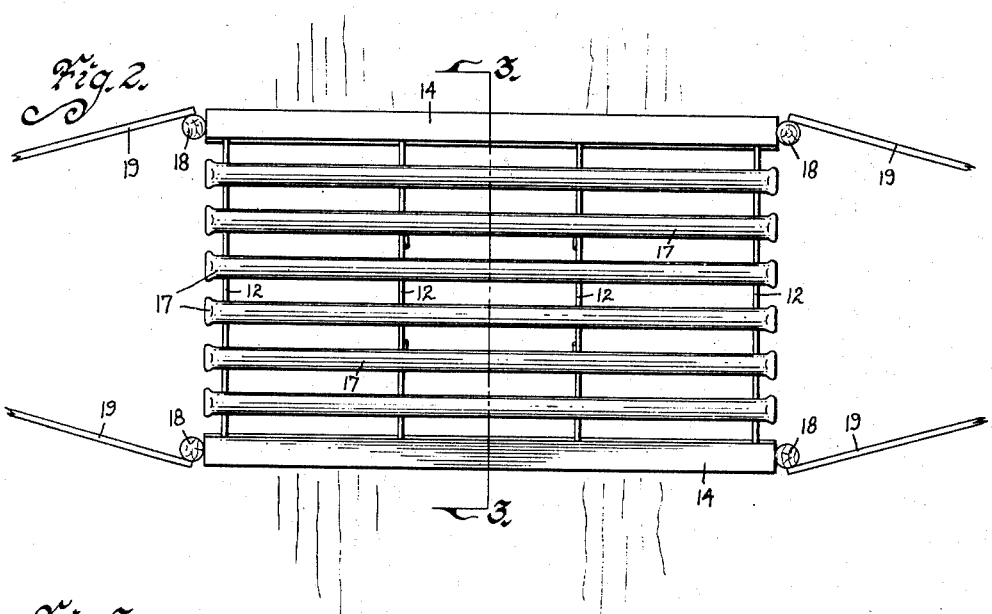
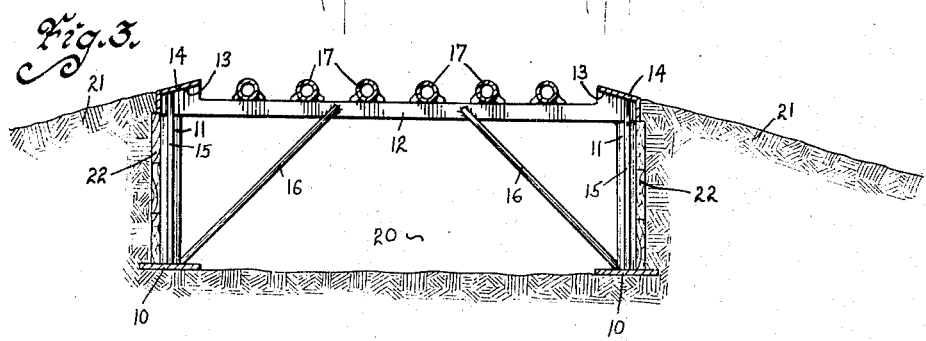
Witness
Edward P. Seely
Inventor
Leo A. Henningsen
by M. Talbert Dick
Attorney Patented Dec. 26, 1950

2,535,795

UNITED STATES PATENT OFFICE 2,535,795

CATTLE GUARD

Leo A. Henningsen, Preston, Iowa

Application November 19, 1949, Serial No. 128,361

3 Claims. (Cl. 256—17)

My invention relates to a cattle guard designed for use in a roadway to keep cattle and the like from passing beyond a designated point.

Many types of cattle guards have long been in use and they generally consist of some kind of spaced apart members disposed transversely to a roadway and arranged over a pit so that the top of the guard forms a part of the roadway. It is known that cattle will not walk over such a surface and therefore a cattle guard is very useful where fence lines intersect roadways. Many roads, including highway may pass through a pasture or farm or several adjacent pastures and farms and in such instances it would be not only impractical but highly inconvenient for vehicular travel if there were a gate across the road at each fence line. Likewise, on a single farm there may be a road through a pasture into fields where crops are harvested by mechanical equipment and a gate into and out of the pasture would have to be opened and closed each time a vehicle passed through. In such places, a cattle guard provides a means for unobstructed passage for vehicle and yet keeps the cattle within the desired area because they instinctively will not walk over the guard.

Most cattle guards consist of various parts secured together by bolts and nuts, pins or the like and once installed are generally of a permanent nature. They require considerable work in assembling or dismantling. In my invention I have provided a novel type arrangement and construction for such a cattle guard.

The principal object of my invention is to provide a cattle guard of solid metal construction that requires no assembling and need only be placed in a pit in a roadway to eliminate the need for a gate and which will keep cattle and the like within desired limits and at the same time permit unobstructed passage of vehicles or persons.

A further object of this invention is to provide a cattle guard of the above class that may be provided with posts on the side thereof that are designed to support a gate to permit the passage of cattle at times at a point adjacent the guard.

A still further object of this device is to provide a solid welded metal cattle guard that can be removed intact from one point and easily transported to and reset at any other designated point.

A still further object of my invention is to provide a cattle guard of the above classes that is simple in construction and durable in use.

These and other objects will be apparent to those skilled in the art.

My invention consists in the construction, arrangement, and combination of the various parts of the device, whereby the objects contemplated are attained as hereinafter more fully set forth, pointed out in my claims, and illustrated in the accompanying drawings, in which:

Fig. 1 is a perspective view of my cattle guard ready to be set in a roadway,

Fig. 2 is a top view of this device shown in Fig. 1 and showing posts on each side thereof that are designed for supporting a gate, and Fig. 3 is a cross-sectional view of this device taken on the line 3—3 of Fig. 2.

Referring to the drawings I have used the numeral 10 to designate a pair of spaced apart horizontal elongated flat metal mudsill members. Welded to each sill member 10 is a plurality of vertical support metal members 11 in spaced relation longitudinally thereon as shown in Fig. 1. As shown in the drawings, the support members 11 are cylindrical in shape but may be of a different design if desired. Each sill 10 has a like number of support members 11 which are arranged so the supports on one sill are transversely opposite a corresponding support on the other sill, as shown in Fig. 1.

The numeral 12 designates a plurality of metal stringer members disposed transversely to the sills 10 with one of such stringers welded to the top of each pair of corresponding support members 11. Each of the stringers 12, on each end thereof extends upwardly at substantially a right angle from the main portion thereof and has the outwardly downwardly slanting top edge 13, as shown in Fig. 3. The numeral 14 designates a pair of elongated angle iron approach beam members that are respectively arranged parallel to the respective sill members 10 and are secured to the ends of the stringer members 12 on each respective end thereof. Each beam 14 has its horizontal portion bent upwardly so that it can be secured to the slanted surface 13, as shown in Fig. 3.

The numeral 15 designates a plurality of rod brace members. Preferably two of such braces are positioned on each sill 10 between each two support members 11 as shown in Fig. 1. The bottom of each brace 15 is welded to the top of the sill 10 and the top of each brace is welded to the underside of the horizontal portion of the beam 14, as shown in Fig. 3.

The numeral 16 also designates a plurality of rod braces of the same type as the braces 15 except that the braces 16 are secured at one end respectively to one of the stringers 13 and at the other end respectively to the sill 10 adjacent one of the supports 11, as shown in Fig. 3.

The numeral 17 designates a plurality of elongated spaced apart parallel pipe members disposed transversely on the stringers 12 and secured thereto. Each pipe 17 on each end is pinched together and bent slightly downwardly, as shown in Fig. 1.

The structure just described is of all metal construction having all parts thereto welded in place. If desired, post members 18 may be secured to this device, as shown in Fig. 2, to support a gate 19.

When thus arranged and constructed as described this cattle guard is used as follows: A pit 20 is dug in a roadway 21 at the designated place for the guard which is then placed therein so that the pipe members 17 and the approach beams 14 are transverse to the roadway. The sills 10 will rest on the bottom of the pit and the depth of the pit should be sufficient so that the beams 14 will meet the surface of the roadway 21, as shown in Fig. 3. The sides of the pit are preferably supported by the planks 22 which rest on the sills 10, as shown in Fig. 3.

This cattle guard is so constructed that it can be removed as a unit to clean out the pit or moved from one pit to another. It is rigid in construction and can be made to support any calculated load capacity.

The gate posts 18 are optional and can be used if a cattle gate should be desired at the side of the cattle guard.

A cattle guard as I have described can be used in a wide or narrow road and can be used to replace a gate or in conjunction with one. It can also be placed on a level terrain or where there has been a fill.

Some changes may be made in the construction and arrangement of my cattle guard without departing from the real spirit and purpose of my invention, and it is my intention to cover by my claims, any modified forms of structure or use of mechanical equivalents which may be reasonably included within their scope.

I claim:

1. In a cattle guard, two spaced apart flat elongated sill members, a plurality of support members spaced longitudinally on each of said sill members and vertically secured thereto; each of said support members on one of said sills transversely opposite a corresponding support on the other sill member, a plurality of stringer members disposed transversely to said sill members and each of said stringers respectively secured to the top of each pair of corresponding support members, a plurality of spaced and substantially parallel pipe members arranged transversely on said stringer members and secured thereto, a pair of angle iron approach beams secured respectively to the ends of each stringer member so that one of said beams is substantially parallel to and above each of said sill members, a brace member between each two support members on each sill member; each of said braces disposed at an angle between the vertical and horizontal so that one end respectively is secured to one of said sill members and the other end respectively is secured to one of said beam members, and a plurality of brace members securing said stringers to each of said sill members.

2. In a cattle guard, two spaced apart flat elongated sill members, a plurality of support members spaced longitudinally on each of said sill members and vertically secured thereto; a plurality of stringer members disposed transversely to said sill members and each of said stringers secured at its respective ends to the top of one of said support members, a plurality of spaced and substantially parallel pipe members arranged transversely on said stringer members and secured thereto, a pair of angle iron approach beams secured respectively to the ends of each stringer member so that one of said beams is substantially parallel to and above each of said sill members, a brace member between each two support members on each sill member, and a plurality of brace members securing said stringers to each of said sill members.

3. In a cattle guard, two spaced apart flat elongated sill members, a plurality of support members spaced longitudinally on each of said sill members and vertically secured thereto; a plurality of stringer members disposed transversely to said sill members and each of said stringers secured at its respective ends to the top of one of said support members, a plurality of spaced and substantially parallel pipe members arranged transversely on said stringer members and secured thereto, a pair of angle iron approach beams secured respectively to the ends of each stringer member so that one of said beams is substantially parallel to and above each of said sill members, a brace member between each two support members on each sill member, and a plurality of brace members securing said stringers to each of said sill members, all members of this device rigidly secured together in their respective position to form a compact cattle guard for use as described and for transporting as a unit.

LEO A. HENNINGSEN.

REFERENCES CITED

The following references are of record in the file of this patent:

UNITED STATES PATENTS

| Number | Name | Date |
|---|---|---|
| 902,882 | Howery et al. | Dec. 15, 1908 |
| 2,518,855 | Balzer | Aug. 15, 1950 |